United States Patent [19]

Jenson

[11] Patent Number: 5,570,109
[45] Date of Patent: Oct. 29, 1996

[54] SCHEDULE AND TO-DO LIST FOR A PEN-BASED COMPUTER SYSTEM

[75] Inventor: Scott A. Jenson, Redwood City, Calif.

[73] Assignee: Apple Computer, Inc., Cupertino, Calif.

[21] Appl. No.: 394,555

[22] Filed: Feb. 27, 1995

Related U.S. Application Data

[63] Continuation of Ser. No. 57,101, May 3, 1993, abandoned, which is a continuation-in-part of Ser. No. 889,470, May 27, 1992.

[51] Int. Cl.⁶ .................................................. G09G 5/00
[52] U.S. Cl. ........................................................ 345/146
[58] Field of Search ................................. 345/115, 116, 345/157, 145, 146; 395/100, 147, 160; 364/400, 401; 382/67

[56] References Cited

U.S. PATENT DOCUMENTS

| | | | |
|---|---|---|---|
| 4,645,238 | 2/1987 | Vincent et al. | 382/67 |
| 5,050,105 | 9/1991 | Peters | 364/521 |
| 5,063,600 | 11/1991 | Norwood | 382/13 |
| 5,070,470 | 12/1991 | Scully et al. | 364/705.08 |
| 5,129,057 | 7/1992 | Strope et al. | 395/161 |
| 5,165,012 | 11/1992 | Crandall et al. | 395/100 |
| 5,247,438 | 9/1993 | Subas et al. | 364/400 |
| 5,307,086 | 4/1994 | Griffin et al. | 345/116 |
| 5,385,475 | 1/1995 | Sudman et al. | 434/307 R |

OTHER PUBLICATIONS

Simpson, Alan. Mastering WordPerfect 5.1 & 5.2 For Windows, 1992, pp. 37–38.
O'Connor, Rory J., "Apple Banking on Newton's Brain" (San Jose Mercury News, Apr. 22, 1992).
Weiman, Liza et al, "A Step toward the Future" (Macworld, Aug. 1992, pp. 129–31).
Soviero, Marcelle M., "Your World According to Newton" (Popular Science, Sep. 2993, pp. 45–49).
Abatemarco, Fred, "From the Editor" (Popular Science, Sep. 1992, p4).
PC Magazine, 1992, describes a scheduling program, Pack-Rat 4.0, and lists functions of the program.
Thompson, M. Keith, "Ascend: Windows PIM Follows Strict Time–Management Philosophy" (PC Magazine, Mar. 31, 1992, p.54).
Sharp Electronic Organizer Model ZQ–5000/ZQ–5200 Operation Manual, Sharp Electronic Corp., 1990.

*Primary Examiner*—Jeffery Brier
*Attorney, Agent, or Firm*—Hickman Beyer & Weaver

[57] ABSTRACT

A method and apparatus for controlling a schedule and a to-do list on a computer display. A computer implemented method of the present invention includes the steps of displaying a calendar controller on a computer display, selecting at least one date on the calendar controller, determining a display mode, and displaying a content area on the computer display. The content area are preferably includes either a schedule or a to-do list for the selected date or dates, and both the content area and the calendar controller are concurrently active. A scheduling and to-do list apparatus includes a digital processor, a display coupled to the digital processor, a mechanism for determining a display mode, a mechanism for displaying a calendar controller on the display, a mechanism for selecting at least one date on the calendar controller, and a mechanism for displaying a content area or on the display. The apparatus is preferably implemented as a pen-based computer system, where a primary form of user input comprises strokes made by a stylus upon a tablet overlying the display.

25 Claims, 17 Drawing Sheets

SCHEDULE AND TO-DO LIST FOR A PEN-BASED COMPUTER SYSTEM

CROSS-REFERENCE TO RELATED APPLICATIONS

This is a continuation of application Ser. No. 08/057,101 filed May 3, 1993, now abandoned, which is a continuation-in-part of co-pending U.S. patent application Ser. No. 07/889,470 filed May 27, 1992 on behalf of Jenson et al. and entitled Method and Apparatus for Controlling a Scheduler, assigned to the assignee of the present invention, the disclosure of which is hereby incorporated herein by reference in its entirety.

BACKGROUND OF THE INVENTION

The present invention relates generally to computerized calendars and to-do lists and more particularly to calendars and to-do lists used on electronic personal organizers and pen-based computer systems.

Computerized personal organizers are becoming increasingly popular with a large segment of the population. Computerized personal organizers tend to be small, light-weight, and relatively inexpensive, and can perform such functions as keeping a calendar, an address and telephone book, a to-do list, etc. While many of these functions can also be provided conventional computer systems, personal organizers are very well suited to the personal organization task due to their small size and portability. Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPL senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

Two of the most frequently used functions of a personal organizer are the daily calendar (or schedule) and the to-do list. A user typically selects a schedule or to-do date by means of a keyboard entry or other select button.

A problem with schedules and to-do lists of the prior art is that their user interface tends to be awkward. Personal organizers often require a number of keystrokes to enter the date or range o dates to be viewed. Even computers with windowing systems tend to be awkward because they present the user with a controller in one window and a di play in another window. When in the controller window, the user is locked out of the schedule display window and vice versa. Furthermore, the schedule control window is often displayed on top of the schedule display window, thereby obscuring the schedule information. This two window, modal (i.e. only one window s active at a time) system makes it difficult to easily traverse and browse through he schedule or to-do information.

Another limitation of calendars and to-do lists of the prior art is that the format of the displayed schedule information is limited. Most calendars and to-do lists restrict the display of schedule information to one day at a time or one week at a time. It would be desirable to be able to select other display formats, such as a three day schedule or the schedule for the next four Fridays.

Calendars, to-do lists, and notepad applications of the prior art are not always tightly integrated. They may have different user interfaces, requiring more learning on the part of a user and increasing the chance of user error. Also, if they are not integrated, a user will have to go through the time-consuming process of exiting one application program and starting another. Furthermore, non-integrated application programs often have problems communicating with each other, thereby often requiring the duplicative entry of data.

SUMMARY OF THE INVENTION

The present invention provides an efficient, intuitive method and apparatus for controlling both a schedule and a to-do list on the screen of a pen-based computer system. The method and apparatus permits a simple toggling between a schedule and a to-do list, and allows information from several dates to be displayed simultaneously. The schedule and to-do list are tightly integrated due to their common control by a calendar-like interface. Information can be easily transferred between the schedule and the to-do list.

A method for controlling a schedule and a to-do list in accordance with the present invention comprises the steps of: a) displaying a calendar controller in a calendar controller area on a computer display; b) selecting at least one date on the calendar controller; c) determining a display mode; and d) displaying a content area on the computer display, such that both the calendar controller and the content area are concurrently active. Preferably, the content area comprises either a schedule or a to-do list.

The calendar controller preferably comprises the depiction of a one-month calendar. A single date can be selected by engaging the date on the calendar controller with a pointer mechanism, such as the stylus of a pen-based computer system. A linear group of dates (arranged either horizontally or vertically) can be selected by engaging a first date with the stylus, and dragging the stylus across the computer screen until the last desired date in that line has been engaged. All of the dates corresponding to a particular day of the month (e.g. all Tuesdays in the month) can be selected by engaging the a label (e.g. the Tuesday label) of the calendar controller.

A scheduling and to-do list apparatus in accordance with the present invention includes: a) a digital processor; b) a display coupled to the digital processor; c) a mechanism for choosing a display mode; d) a mechanism for displaying a calendar controller on tie display; e) a mechanism for choosing at least one date on the calendar controller; and f) a mechanism for displaying either a schedule or a to-do list as determine by the display mode. The schedule or to-do list remains concurrently active with the calendar controller.

Preferably, the apparatus is implemented as a pen-based computer system. The mechanism for choosing a display mode and the mechanism for choosing at least one date can therefore comprise the display, an input tablet overlying the display, and a stylus for "writing" on the input tablet. The mechanism for displaying either the schedule or the to-do list is preferably controlled by a button which toggles between the two display modes. The calendar controller preferably comprises a one-month calendar which can have a date or a group of dates selected by means of the stylus.

An advantage of the present invention is that an elegant and consistent interface is used to control multiple date-based applications, such as a schedule and a to-do list. Since the calendar controller and the content area are concurrently active (i.e. they are non-modal) information can be quickly updated and modified. Information associated with a single date or with a number of dates can be displayed simultaneously, and multiple date-based applications are tightly integrated for inter-application communication.

These and other advantages of the present invention will become apparent upon reading the following detailed descriptions and studying the various figures of the drawings.

DETAILED DESCRIPTION OF THE PREFERRED EMBODIMENTS

The present invention is well suited for pointer based computer systems such as the pen-based, stylus-based and mouse driven systems that are currently popular. For the purposes of illustration, the invention will be described in connection with a pen-based system.

Figure 1:
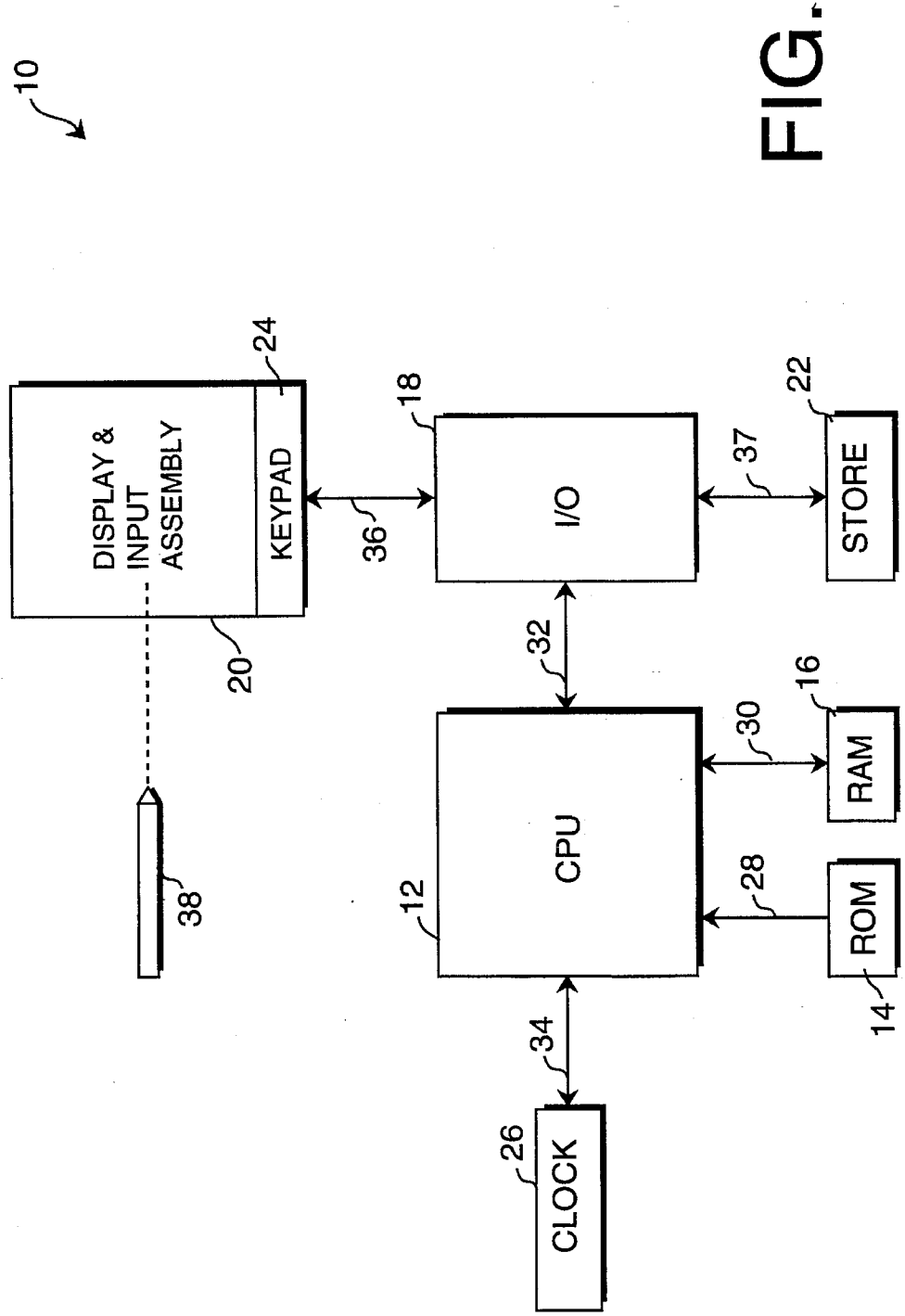
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24, and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit The use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 preferably comprises a real-time clock to provide real-time information to the system 10. Clock 26 is coupled to CPU 12 by a data bus 34.

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device Of display assembly 20 is preferably a thin, clear membrane which covers the LCD display and which is sensitive to the position of a stylus 38 on its surface. With such a structure, the display assembly 20 can serve as an input "tablet." These position sensitive membranes are also readily available on the commercial market. Combination display assemblies such as display assembly 20 which include both the LCD and the input membrane are commercially available from such vendors as Scriptel Corporation of Columbus, Ohio.

The keypad 24 can comprise an array of switches. In the present embodiment, the keypad 24 comprises mechanical buttons which overlie the bottom edge of the membrane which covers the LCD display. When the buttons are depressed, the membrane senses the pressure and communicates that fact to the CPU 12 via data bus 36 and I/O 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. Mass storage 22 can be coupled to I/O circuitry 18 by a bi-directional data bus 37. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, non-volatile memory such as flash memory, battery backed RAM, PC-data cards, or the like.

In operation, information is input into the pen-based computer system 10 by "writing" on the screen of display assembly 20 with a stylus 38. Information concerning the location of the stylus 38 on the screen of the display assembly 20 is input into the CPU 12 via data bus 36 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
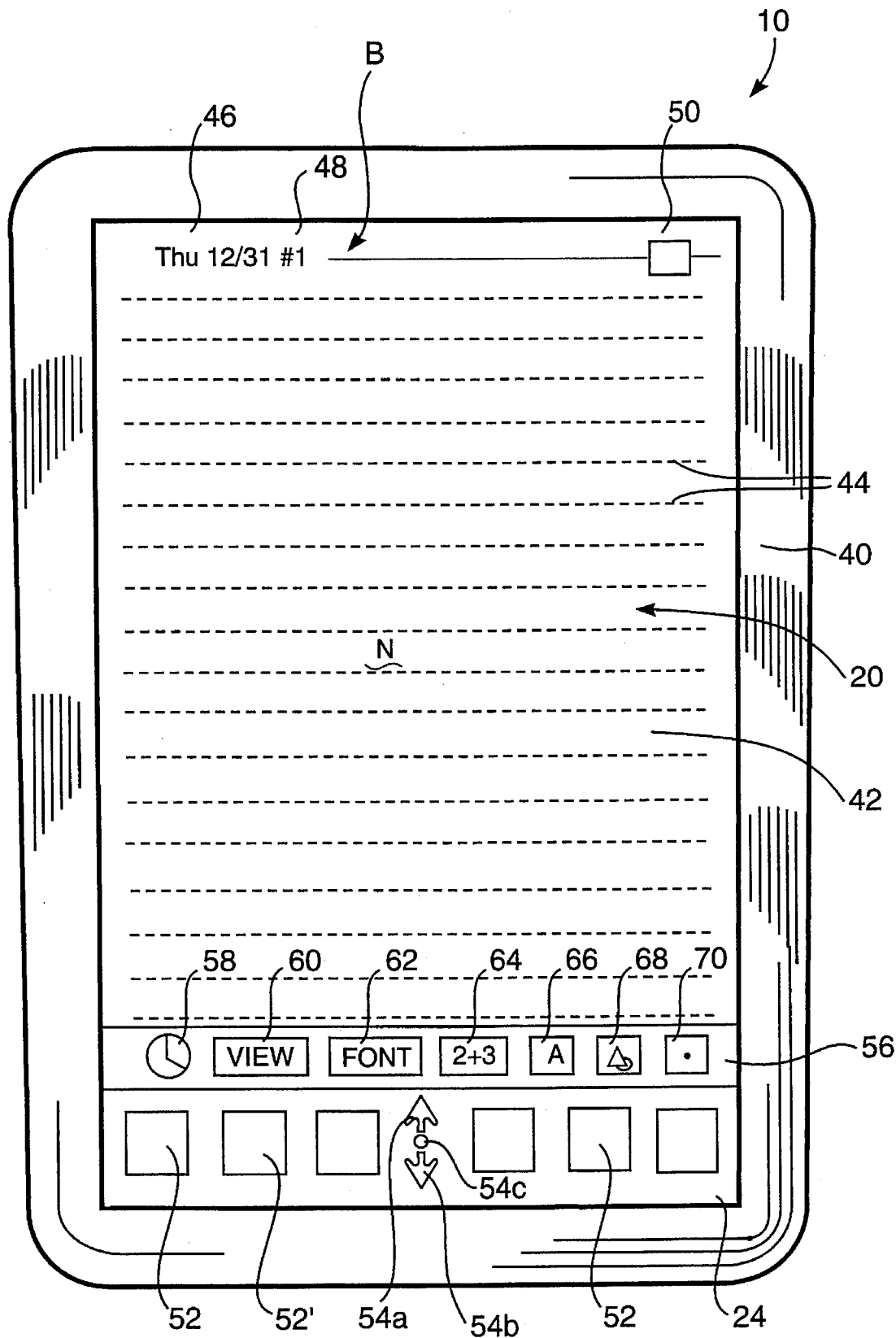
FIG. 2 is a top plan view of the screen, case, and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a header bar B and a number of guidelines 44. The header bar B preferably includes the date of creation 46 of the note N, a note number 48, and a "toolbox" button 50. The optional guidelines 44 aid a user in entering text, graphics, and data into the pen-based computer system 10.

In this preferred embodiment, the keypad 24 is not a part of the viewing screen 42 but rather, is a permanent array of input buttons coupled to the CPU 12 by I/O circuitry 18. Alternatively, the keypad 24 could comprise "soft buttons" i.e. images generated at convenient locations on the screen 42, in which case a "button" would be activated by touching the stylus to the screen over the image of the button. The keypad 24 preferably includes a number of dedicated function buttons 52 and a pair of scroll buttons 54A and 54B. The operation of the scroll buttons 54A and 54B, and other aspects of computer system 10 are discussed in greater detail in co-pending U.S. patent application Ser. No. 07/868,013, filed Apr. 13, 1992 on behalf of Tchao et al., assigned to the assignee of the present invention and incorporated herein by reference in its entirety. In this embodiment, the toolbox button 50 is represented as a "soft button" in the header bar B. However, in alternative embodiments, a physical keypad button could be used in its place.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, run within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 58, a view button 60, a font button 62, an equations button 64, a text button 66, a graphics button 68, and a nib button 70. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

One of the buttons 52 of the keypad 24 is preferably dedicated to "date" type functions, including a calendar or schedule (herein referred to as "schedule" to prevent confusion with the calendar controller) function and a to-do function. This dedicated button 52 (known hereafter as the "date button") is labeled 52' in FIG. 2. When date button 52' is pressed, the schedule/to-do navigation process of the present invention is activated.

A preferred data structure for use in the present invention is known as a "frame" system, which is a form of semantic network. As is well known to those skilled in the art, a semantic network is a knowledge representation system where unary predicates are treated like types and binary predicates are treated like attributes. Further, the types are arranged in a taxonomy where sub-assumption holds.

A semantic network can be represented by a directed graph where the nodes are either types or constants and the edges are either labeled with an attribute or with the special label IS-A. To find out if a particular individual has a certain attribute, a search is commenced at a node representing that individual and traveling up the IS-A links until a node is found with an edge labeled with the attribute. Therefore, graph traversal is the main source of inference in a semantic network.

As noted above, semantic networks are well known to those skilled in the art of building knowledge bases. A description of semantic networks can be found in "A Fundamental Tradeoff in Knowledge Representation and Reasoning", *Readings in Knowledge Representation*, by Brachman and Leveseque, Morgan Kaufman, San Mateo, 1985. The frame system is an elaboration of a semantic network. See, Brachman and Leveseque, supra. Frame systems elaborate on the structure of types themselves and their attributes. Specifically, frame systems have three aspects:

1) Values of attributes are stored explicitly or stored as a default value that the individual slot can inherit. This effectively caches some of the graph traversal.

2) Value or role restriction are constraints that must be satisfied by attribute values. These restrictions can constrain a value to be of a certain type (known as value class), of a certain maximum or minimum cardinality (in the case of multi-valued slots), or a combination of both.

3) Attached procedures (also known as daemons or angels) that are invoked when a values is accessed (either by getting or setting). This allows values to be computed on-the-fly. The procedures can be completely arbitrary or be expressed in a restricted language. In either case, the procedure returns the computed value and whatever side-effects that may have occurred.

Frames used in the present invention have a number of slots which may contain data, daemons, or other frames. Slots are accessed by making assertions to the knowledge base. Frame systems in accordance with the present invention are described in greater detail in copending U.S. patent application Ser. No. 07/889,225, filed May 27, 1992, on behalf of Luciw et al., entitled "Method and Apparatus for Deducing User Intent and Providing Computer Implemented Services", and assigned to the assignee of the instant application, the disclosure of which is hereby incorporated by reference in its entirety.

Inputs and outputs in the described invention are preferably accomplished within the context of a computer implemented process known as a "view system." In such a view system, various "views" or "objects" are stacked on top of each other, like pages of paper on a desk top. These views include a root view (such as the notepad) and virtually any number of views (within the limitations of the system) stacked on top of the root view. View systems are well known to those skilled in the art.

The view system is a software routine which returns two pieces of information when the screen engaged ("tapped") with a stylus. A first piece of information returned which view or "object" was tapped. The second piece of information returned is the position of the tap on the tapped view. This location information is often returned in the form of Cartesian (x-y) coordinates. The view system therefore handles much of the routine input work for the computer system. Taps by stylus on non-active areas of the screen can be ignored by the view system. Likewise, inappropriate inputs on active areas of the screen can be ignored or can generate error conditions which can be acted upon by the system.

The view system also greatly simplifies output to the computer screen. A "view object" can be created having defined parameters such as height, width, border type, position, etc. Then, the view system can be simply requested to display the view object. Other objects, such as text objects, can be placed within a view object such that they are displayed (to the extent possible) when the view object is displayed.

The term "object" has been used extensively in the preceding discussions. As is well known to software developers, an "object" is a logical software unit comprising data and processes which give it capabilities and attributes. For example, an object can be queried as to its type and can return such data as the number of words that it contains. Objects can contain other objects of the same or of a different type. Objects can also be used to project images on a screen according to their object type. There are many well know texts which describe object oriented programming. See, for example, Object Oriented Programming for the Macintosh, by Kurt J. Schmucher, Hayden Book Company, 1986. In the present invention, objects are preferably implemented as part of the aforementioned frame system. The use of object oriented programming, frame systems, and the aforementioned view system simplifies the implementation of the processes of the present invention.

Preferred Computer Implemented Process

Figure 3A:
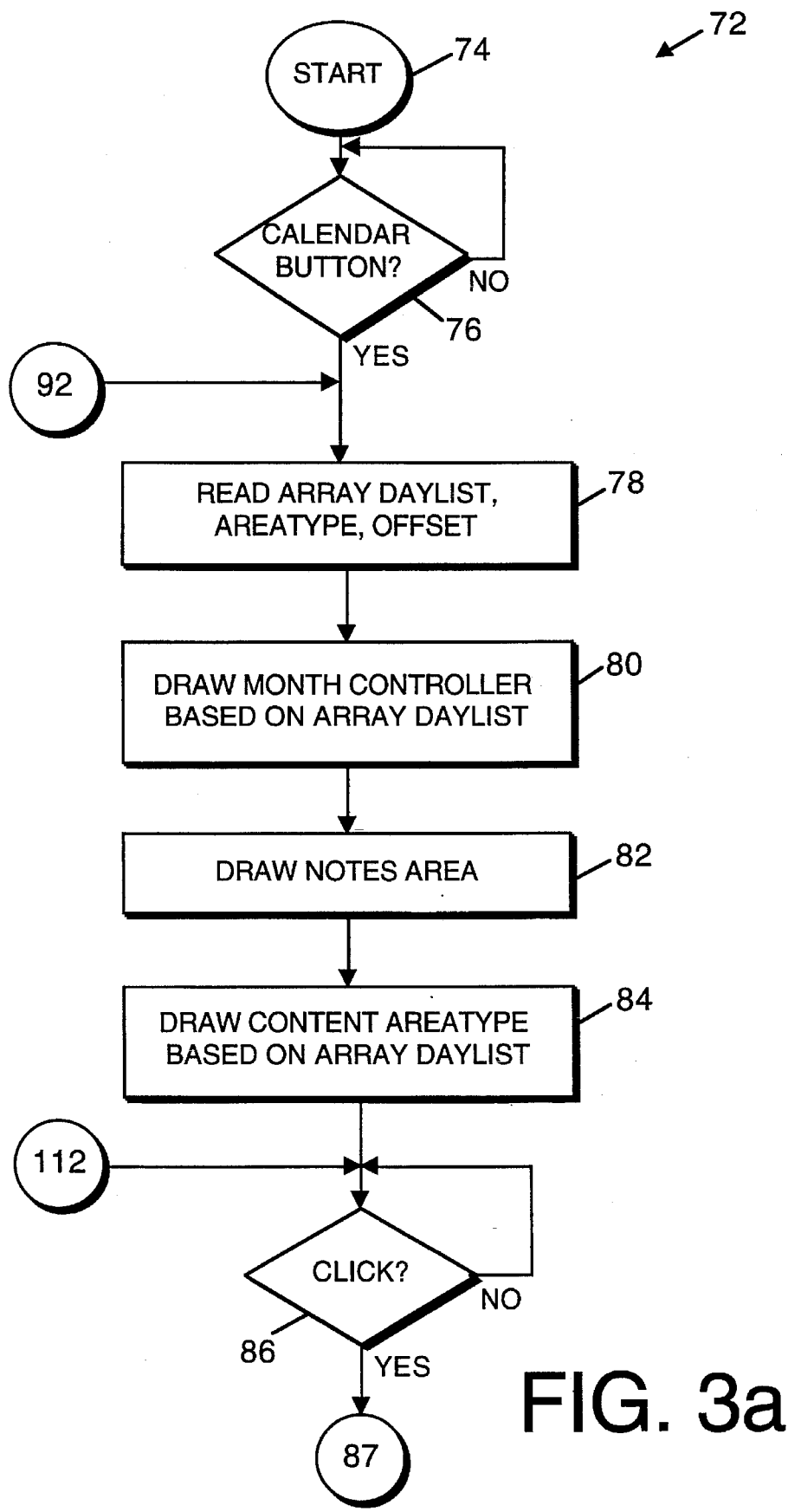
FIGS. 3A and 3B comprise a flow diagram of a process for implementing a calendar,; and a to-do list in accordance with the present invention.
Figure 3B:
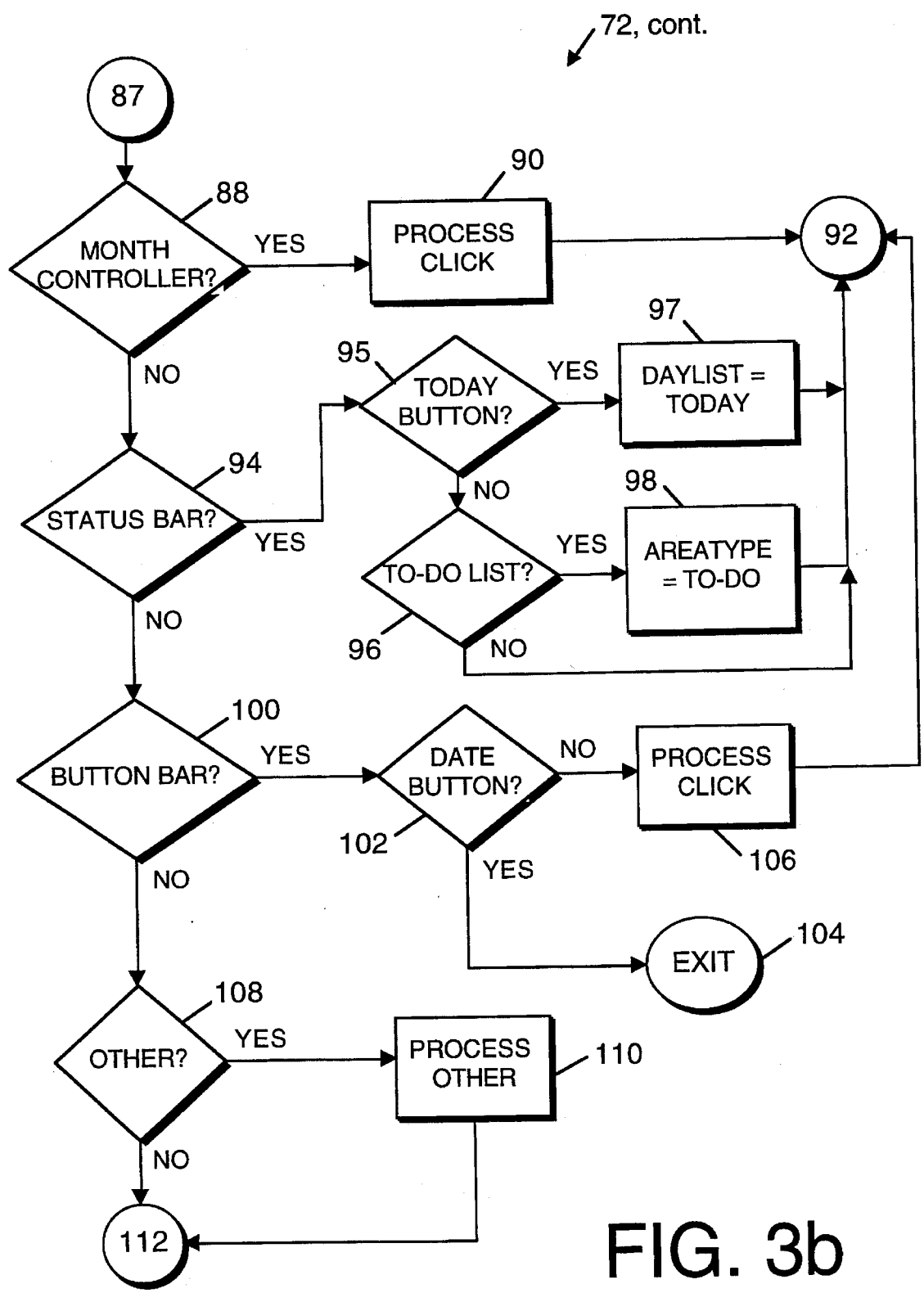

A process 72 in accordance with the present invention is illustrated in FIGS. 3A and 3B. The process 72 begins at a step 74 and, in a step 76, it is determined whether the date button 52' has been pressed. If not, step 76 goes into a wait state. If the date button 52' has been pressed, a step 78 reads certain data, preferably stored in RAM 16, including an array DAYLIST and variables AREATYPE and OFFSET. Next, in a step 80, a month controller based upon the array DAYLIST is drawn on the screen 42. In step 82, a crib-notes area associated with the DAYLIST is drawn in the screen 42 next to the month controller. Finally, in a step 84, the content area according to AREATYPE and DAYLIST is drawn on screen 42 beneath the month controller and the crib-notes area. An example illustrating these three areas on screen 42 will be discussed subsequently.

It should be noted that the month controller provided in step 80 and the content area provided in step 84 are both concurrently active. By "concurrently active" it is meant that both the month controller and the content area are active to display information and to receive inputs from the user, such as by means of the stylus. This "concurrently active" status can be handled by the view system which constantly monitors the view objects comprising the month controller and the content area for new inputs and outputs. From a user's point of view, this means that the month controller and content area can be used for input/output (I/O) substantially simultaneously without having to activating one of the two and deactivating the other, i.e. the month controller and the content area operate in a non-modal fashion.

After step 84 is completed, a step 86 looks for a "click" on the screen 42. As used herein, a "click" is a gesture made by stylus 38 on screen 42 which selects a function to be performed by the apparatus 10. A click, for example, can be a tap of the stylus 38 on the screen 42, or can be the prolonged pressing of the stylus 38 against the screen 42. Preferably, the click of the present invention is the engagement of the tip of the stylus 38 against screen 42 over an active area thereon, and the subsequent removal of the stylus 38 from the screen. If a click is not detected, step 86 goes into a wait state. If a click is detected, process control continues at 87, as shown in FIG. 3B.

In FIG. 3B, a step 88 determines whether the click was within the month controller. If so, a step 90 processes the click, and process control is turned over to 92 of FIG. 3A. If not, a step 94 determines whether the click was within the status bar 94. If it was, a step 95 determines whether the "Today" button (See FIGS. 11a–11f) has been contacted and, if so, the variable DAYLIST is set to TODAY in a step 97, and process control is turned over to point 92 in the flow diagram. If the "Today" button has not been pressed, a step 96 determines whether the click was indicating the entry into the to-do list. If so, AREATYPE is set to TO-DO in a step 98, and process control is returned to 92 (see FIG. 3A). If not, step 96 turns process control directly over to 92, leaving the AREATYPE unchanged.

If step 94 determines that the click is not in the status bar, a step 100 determines whether it is in the button bar. If so, a step 102 determines whether the date button 52' has been clicked, If so, the process 72 ends as indicated by the "exit" step 104. If no, the click in the button bar 24 is processed in a step 106, and process control returns to 92 of FIG. 3A.

If the click was not within the button bar 100, a step 108 determines whether the click was within other recognizable areas of the apparatus 10. If so, the "other" function is processed in a step 110 and the process returns to 112 of FIG. 3A to await another click. If not, process control returns directly to 112.

An example of other recognizable areas include the note area and the content area. For example, the stylus can be used to "write" on the screen in the note area, and the CPU can provide "ink" to render the drawing visible on the screen. Likewise, the stylus can be used to "write" within the content area. Preferably, data entered in the content area is "recognized" by the system as text, graphical, or numerical information. Recognition techniques are well known to those skilled in the art. A preferred architecture for a recognition system utilized in conjunction with the present invention is described in U.S. patent application Ser. No. 08/001,123, filed Jan. 5, 1993 on behalf of Pagallo et al., entitled "Method and Apparatus for Computerized Recognition", assigned to the assignee of the present invention, and incorporated herein by reference in its entirety. Information in the note area, in the present embodiment, is preferably not recognized, i.e. it is left as ink. In alternate embodiments the drawings within the note area can also be recognized by suitable recognition software.

It should be noted that the process 72 illustrated in FIGS. 3A and 3B comprise a conceptual process flow for the present invention. There are other process flows which perform the same functionality. Most preferably, the process 72 is implemented in the context of the aforementioned "view system" which provides CPU 12 with information concerning the location and type of area in which the click occurred. By utilizing the view system, for example, steps 88, 94, 100, and 108 are pre-processed by the viewing system such that the appropriate steps 90, 95, 102, or 110 are automatically initiated. In other words, the steps 88, 94, 100, and 108, in this example, are preferably implemented in parallel rather than in the serial fashion depicted in FIG. 3b. The view system therefore simplifies the processing of clicks and other stylus gestures on the screen, and simplifies the programming effort.

Figures 4, 5:
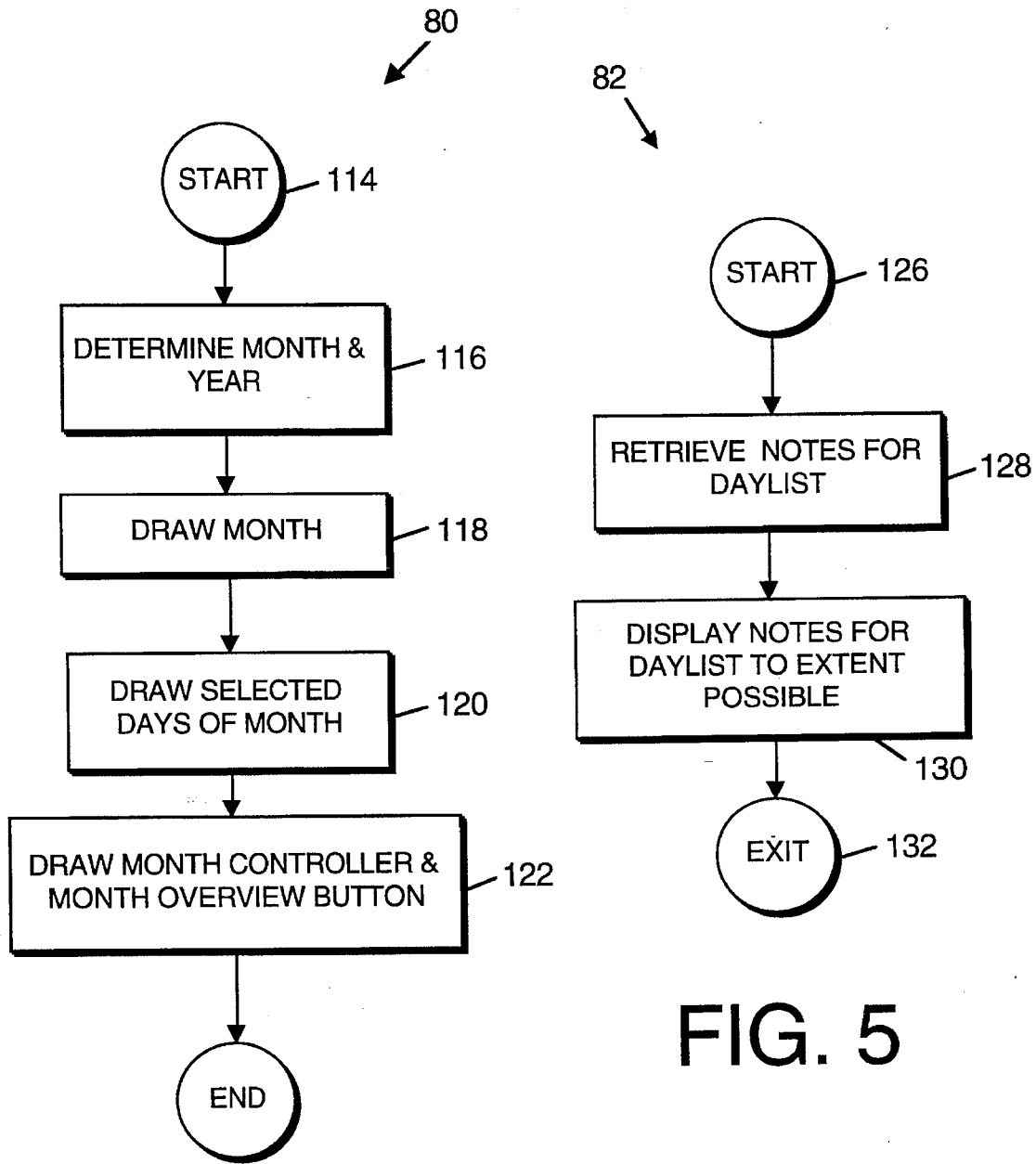
FIG. 4 is a flow diagram illustrating the process step 80 of FIG. 3A.
FIG. 5 is a flow diagram illustrating the process step 82 of FIG. 3A.

FIG. 4 illustrates the process step 80 of FIG. 3A in greater detail. Process 80 begins at 114 and, in a step 116, the month and year is determined. The month and year can be provided by the real-time clock 26 of FIG. 1, or can be stored as defaults within RAM 16. Next, in a step 118, the month is drawn in the form of a small calendar selector icon and the selected days of the month from the array DAYLIST are drawn over the calendar selector in a step 120. Finally, a month controller and month overview button are drawn in a step 122, and the process 80 is completed at 124.

The drawing steps such as steps 118–122 can be implemented within the context of the aforementioned view system. The view system, in turn, preferably utilizes graphics software such as QUICKDRAW, developed by Apple Computer, Inc. of Cupertino, Calif. A description of the QUICKDRAW graphics software is found in the book *Inside Macintosh, Volumes I, II, and III*, by C. Rose et al., Addison-Wesley Publishing Company, Inc., July 1988. With such graphics software, a line can be drawn by simply specifying the coordinates of the beginning and the end of the line, a rectangle or "box" can be placed around objects by specifying the corner points of the box, text can be drawn to the screen by specifying font, size, and location, etc. Therefore, the use of such graphics software greatly simplifies the screen drawing process of the present invention.

FIG. 5 illustrates the "Draw Crib Notes Area" process step 82 of FIG. 3a. The process 82 begins at 126 and, in a step 128, crib notes for the current DAYLIST are retrieved from memory, such as RAM 16. Next, in a step 130, the crib notes are displayed within a crib note area of the screen 42. This may involve some cropping of the crib notes if the amount of information to be displayed is greater than the space available. The process 82 is then completed at 132.

Figure 6:
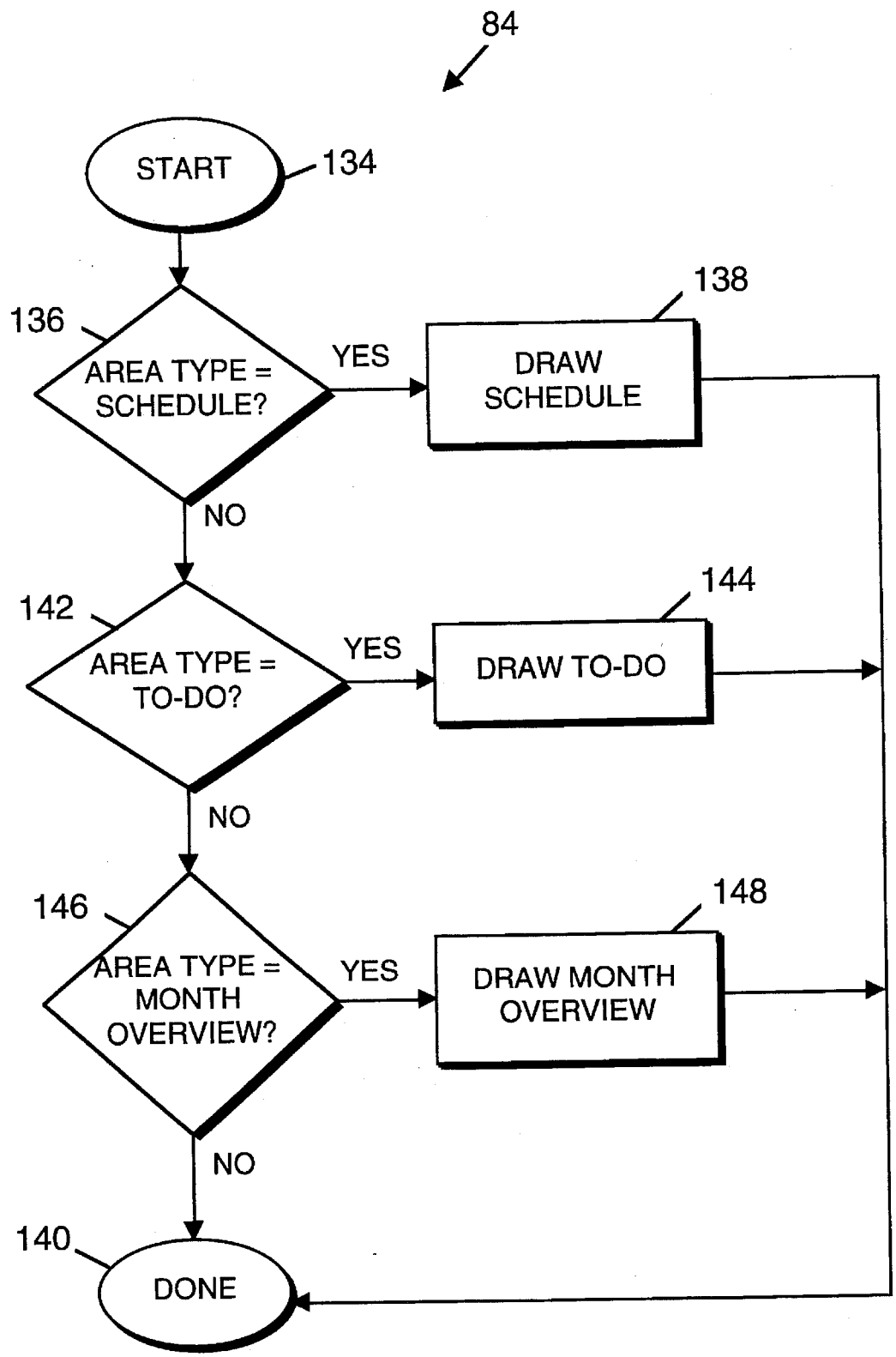
FIG. 6 is a flow diagram illustrating the process step 84 of FIG. 3A.

FIG. 6 illustrates the "Draw Content AREATYPE" process step 84 of FIG. 3A. The process 84 begins at 134 and, in a decision step 136, it is decided whether AREATYPE is SCHEDULE. If so, the schedule is drawn in a step 138 and the process 84 is completed as indicated at 140. If not, a decision step 142 determines whether the AREATYPE is TO-DO and, if so, the To-Do list is drawn in a step 144 and the process is completed at 140. If AREATYPE is not SCHEDULE or TO-DO the process is completed at 140 without any drawing taking place. Again, steps 136–146 are preferably handled by the view system rather than in the sequential manner indicated in this figure.

Figure 7:
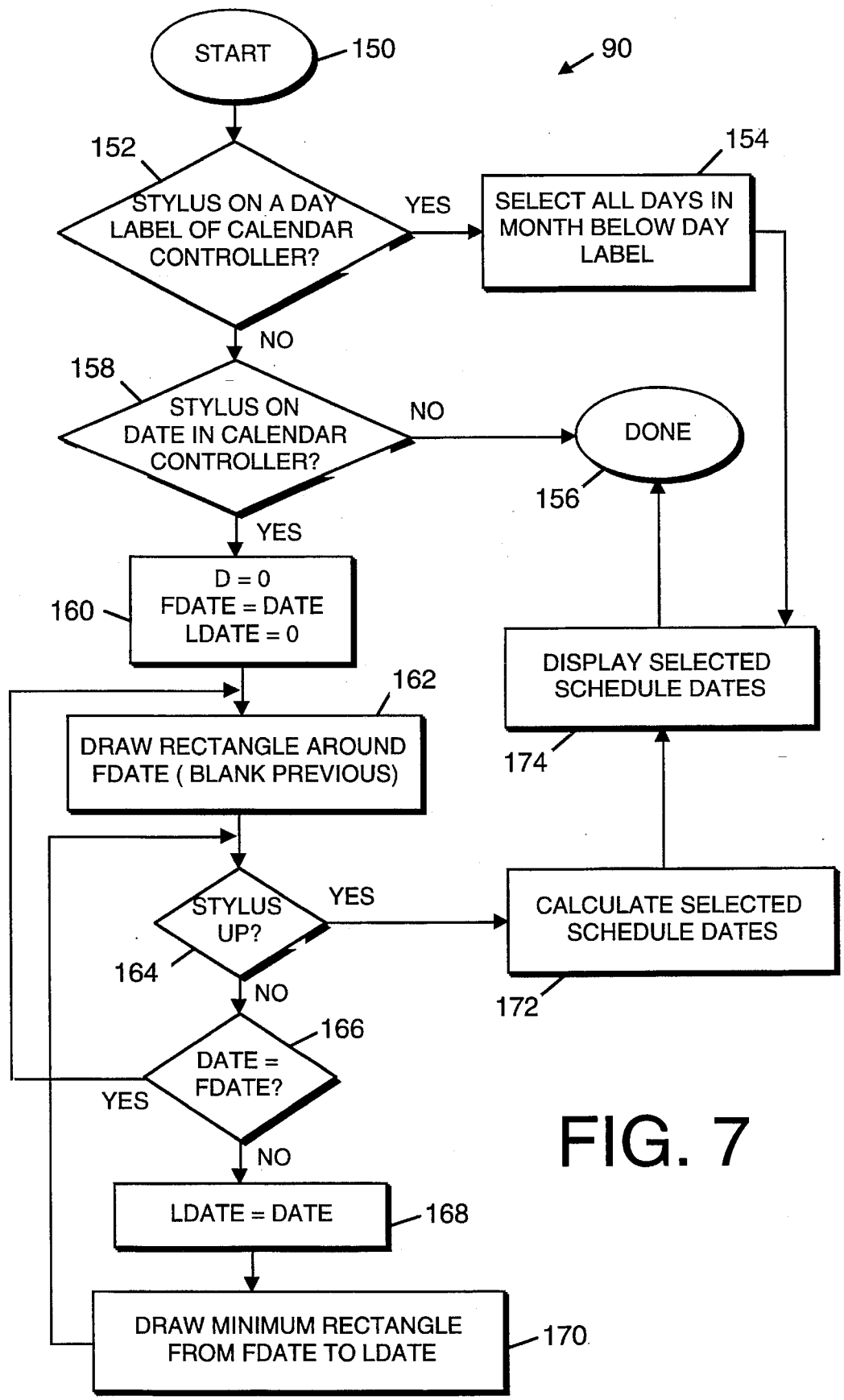
FIG. 7 is a flow diagram illustrating the process step 90 of FIG. 3B.

FIG. 7 illustrates step 90 of FIG. 3B in greater detail. The process 90 processes a click in the month controller of the system. The process 90 begins at 150 and, in a decision step 152, it is determined whether the stylus is on a day label for the calendar controller. If it is, all of the days of the month that are below that day label are selected in a step 154. For example, if the stylus is on the "Tuesday" day label, all of the Tuesdays in the month are selected. The process is then displays the selected schedule dates in a step 174, and the process is completed at 156. Otherwise, if the stylus is not on a day label, a step 158 determines whether the stylus is on one of the dates of the calendar controller. If not, the process is completed at 156 because the stylus has not been placed in a position on the calendar controller that is recognized by the system. If the stylus is on a date, a step 160 initializes several variables including:

D=0

FDATE=DATE

LDATE=0

Where D is a counter, FDATE holds the first selected date on the calendar selector, and LDATE holds the last selected date on the calendar. FDATE is initialized to the date selected on the calendar controller by the stylus. Next, in a step 162, all previous selections are blanked from the calendar selector, and a rectangle is drawn around FDATE. Again, this drawing task is easily handled with such drawing utilities as QUICKDRAW. In a step 164 it is determined whether the stylus has been lifted from the calendar controller. If not, a step 166 determines whether DATE is equal to FDATE, i.e. whether the stylus has moved from its original position (FDATE) on the calendar selector to a new position DATE. The variable DATE is determined by a small software routine, which determines which date is being indicated by the stylus point position. If DATE= FDATE, process control is returned to step 162. IF DATE≠FDATE, then step 168 assigns the value of DATE (i.e. the date that the stylus is currently engaging on the calendar controller) to LDATE, which is the variable which holds the last date that the stylus engaged on the calendar controller, but only if DATE is in the same row or column as FDATE. In other words, a number of dates can be selected by the preceding process, but only if they are aligned within a single row or column. A minimum rectangle (or other indicator such as reverse video highlighting) is then drawn from FDATE to LDATE within a row or column on the calendar controller in a step 170, again preferably using a utility such as QUICKDRAW, and process control is returned to step 164. If step 164 determines that the stylus has been lifted from the screen, a step 172 calculates selected schedule dates in a step 172. Next, in a step 174, selected schedule dates are displayed, and process control is returned to step 152.

Figure 8:
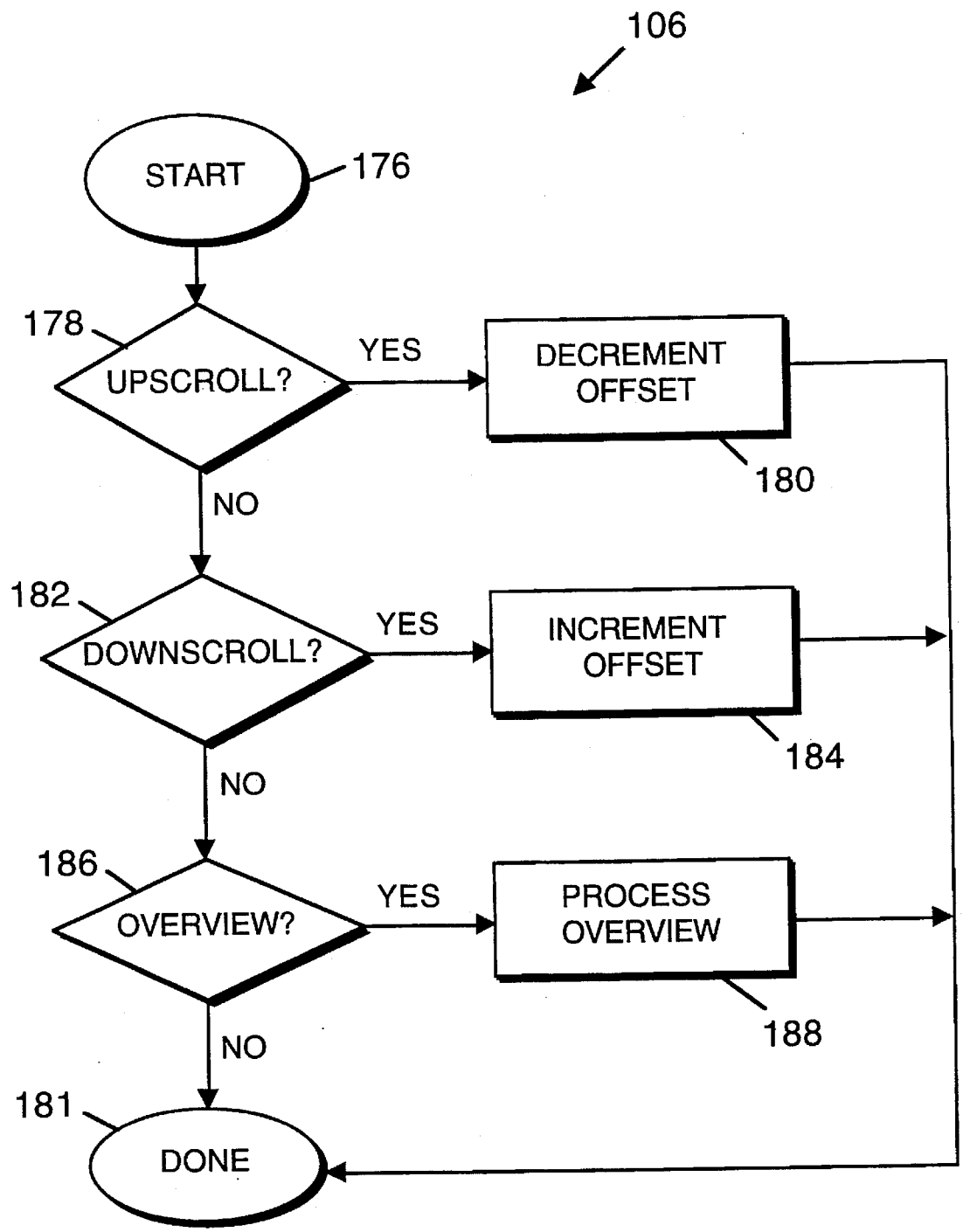
FIG. 8 is a flow diagram illustrating the process step 106 of FIG. 3B.

FIG. 8 illustrates the "Process Click" step 106 of FIG. 3B. The process 106 begins at step 176 and, in a step 178 it is determined whether the click is indicating an upscroll, i.e. if button 54a (FIG. 2) is being pressed. If so, then OFFSET (the screen offset) is decremented by one unit, and the process is completed at 181. A step 182 determines whether the click is indicating a downscroll, i.e. whether the button 54b of FIG. 2 is being pressed. If so, the OFFSET is incremented by one unit. A unit is typically one hour (1 hr.) After step 184 has been completed, the process is completed as indicated at 181. If the stylus is indicating neither an upscroll nor a downscroll, a step 186 determines whether the overview button (54c on FIG. 2) has been engaged by the stylus. If it has, the overview command is processed in a step 188 and the process is completed at 181. In the present preferred embodiment of this invention, the over-view button will display a two week schedule in list form. If the stylus is not engaging the upscroll button 54a, the downscroll button 54b, or the overview button 54c, the process is also completed at 181. Again, the multiple steps 178, 182, and 186 are preferably implemented by the view system such that these decision steps are performed in parallel.

Figure 9A:
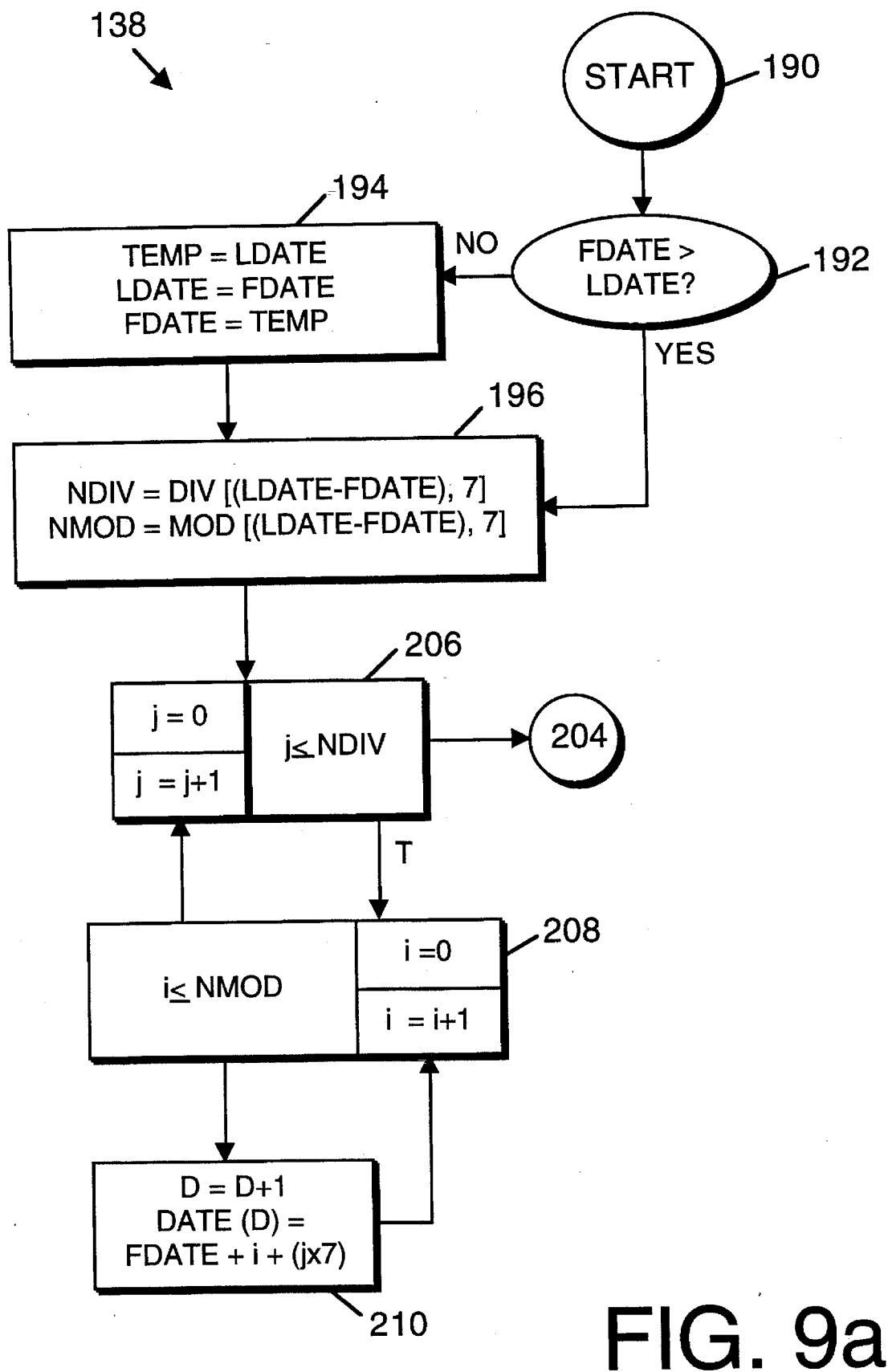
FIGS. 9a and 9b comprise is a flow diagram illustrating the process step 138 of FIG. 6.
Figure 9B:
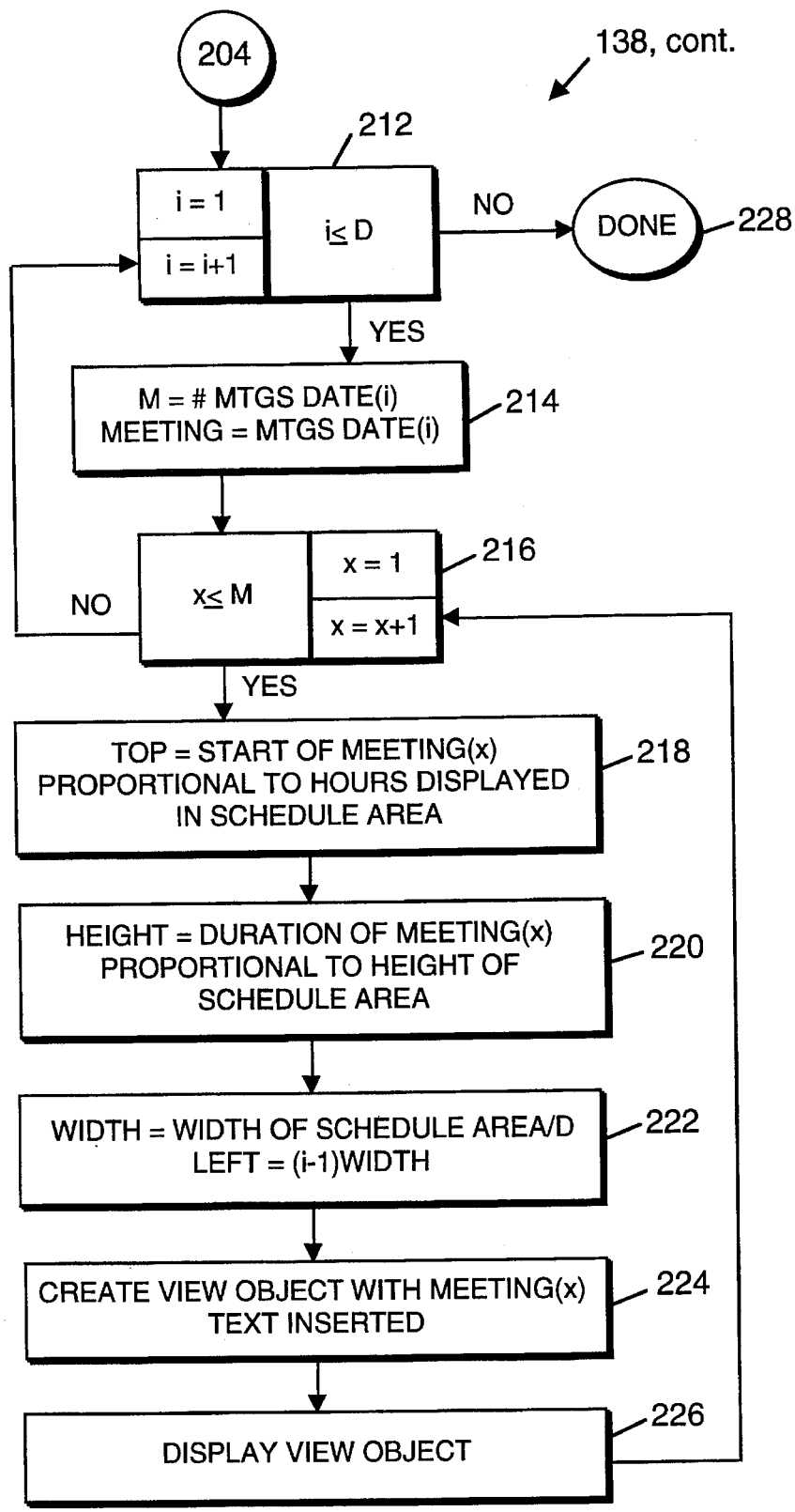

FIGS. 9a and 9b collectively describe the process of step 138 of FIG. 6. The process 138 begins at 190 and, in a step 192, FDATE is compared to LDATE. If FDATE is greater than LDATE, i.e. if the first date selected is greater than the last date selected, the values of FDATE and LDATE are reversed in a step 194. This is accomplished by setting a temporary variable TEMP to the value of LDATE, setting LDATE to the value of FDATE, and setting FDATE to the value of TEMP. The value in TEMP is then no longer needed. If FDATE≦LDATE, or after step 194 has been completed, a step 196 makes the following calculations:

$$NDIV=DIV[(LDATE-FDATE) / 7]$$

$$NMOD=MOD[(LDATE-FDATE) / 7]$$

where NDIV indicates the number of weeks between FDATE and LDATE, and where NMOD indicates the number of days in addition to the number of weeks are between FDATE and LDATE. Next, an iterative loop step 206 initializes a counter j to zero, and compares j to NDIV. If j≦NDIV, an iterative loop step 208 sets a counter i to zero and compares i to NMOD. If i≦NMOD, then the variable D is incremented by one, and the variable DATE(D) of array DATE is assigned the value FDATE+i+(j * 7) in a step 210. The loop comprising steps 208 and 210 is repeated until i>NMOD, at which time process control is returned to step 206. When j>NDIV, process control is turned over to step 212 of FIG. 9b.

After the completion of step 206, process control is turned over to step 212 of FIG. 9b, as indicated by the label 204. Step 212 is an iterative loop step, which initializes a counter i to 1 and compares the counter to D. If i≦D, a step 214 initializes the variable M and array MEETING as follows:

M=The number of meetings on DATE(i)

MEETING(i)=The i$^{th}$ meeting on DATE(i)

Next, in an iterative loop step 216, a counter x is initialized to 1, and is compared to the variable M. If x≦M, then a step 218 defines the variable TOP as the start of MEETING(x) in proportion to the hours displayed in the schedule area. The variable HEIGHT is then set to the duration of MEETING(x) proportional to the height of the schedule area in a step 220. The variable WIDTH is set to the width of schedule area divided by the variable D (i.e. the number of days to be displayed) and the variable LEFT is set to (i−1) times the variable WIDTH in a step 222. Next, in a step 224, a meeting view object is created including a rectangle defined by the variables TOP, WIDTH, HEIGHT, and LEFT, and the MEETING(x) text is inserted into the view object to the extent possible. By "to the extent possible" it is meant that if there is more text in MEETING(x) than will fit within the space provided by the view object, that the text will be cropped or truncated to fit the available space. The view object is a high-level object created in the context of the aforementioned view system, and preferably has a duration bar (see FIGS. 11a–11c) along a left edge thereof to provide an analog representation of the duration of the meeting. These duration bars are easily provided by creating a duration bar view object proximate to a text view object within the meeting view object. Note, as discussed previously, objects (such as the meeting object) can contain other objects (such as the duration bar object and the text object). Next, in a step 226, the view system renders the view object to the screen at a given set of coordinates. Process control then returns to interative step 216 After the completion of the iterative loop 216, i.e. after x>M, process control returns to iterative loop step 212. The completion of the iterative loop 212, i.e. when i>D, the process is completed as indicated at step 228.

Figure 10:
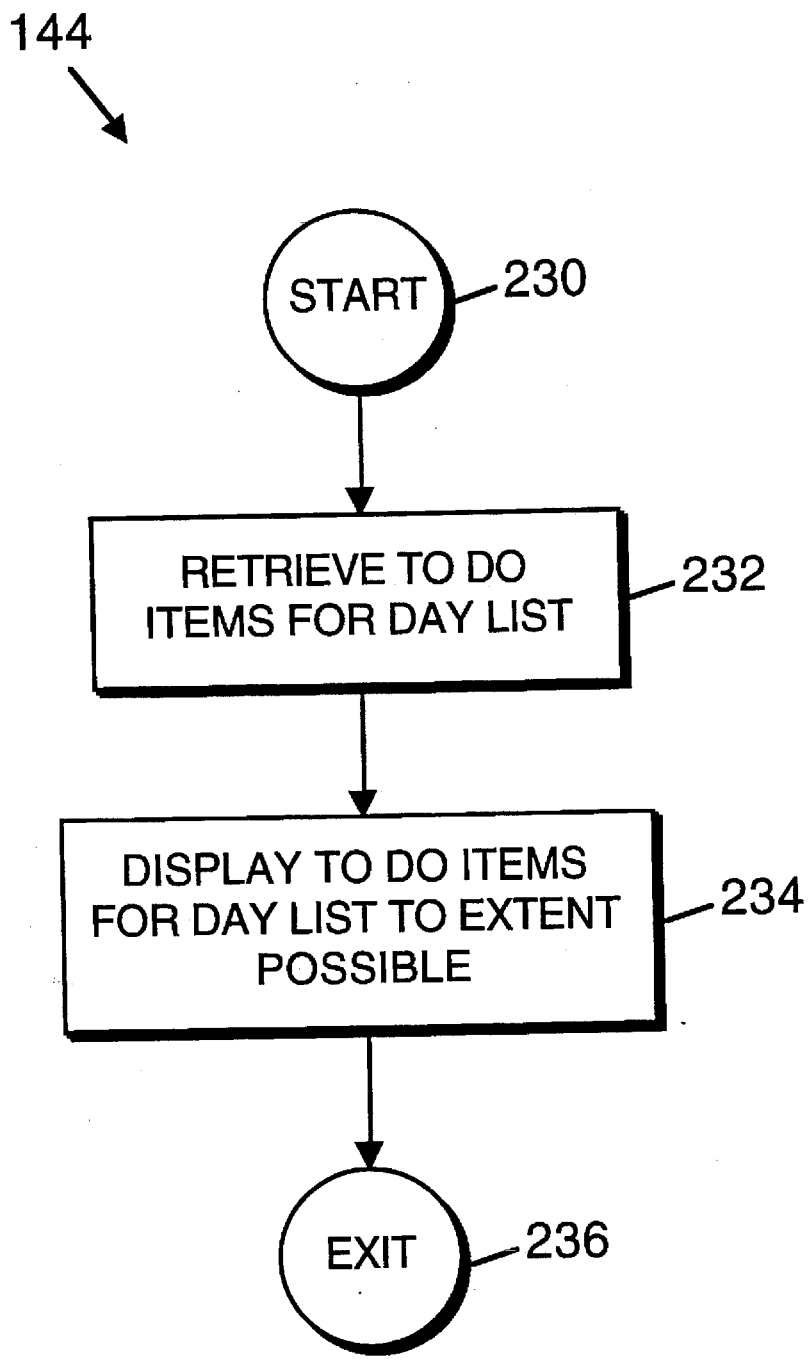
FIG. 10 is a flow diagram illustrating process step 144 of FIG. 6.

FIG. 10 illustrates the "Draw To-Do List" step 144 of FIG. 6. The process 144 begins at 230 and, in a step 232, To-Do items are retrieved from the Day List. This is typically accomplished by first calling the frame system for the view items. Next, a call is made to the view system to create a view object for each To-Do item to be displayed. In a step 234, items for the Day List are displayed to the extent possible, i.e. as much of the items that can fit in the available space. This again is preferably handled by the computer's view system. The process 144 is then completed as indicated at 236.

(Operational Examples

FIGS. 11a–11f illustrate six operational examples of the method and apparatus of the present invention.

Figure 11A:
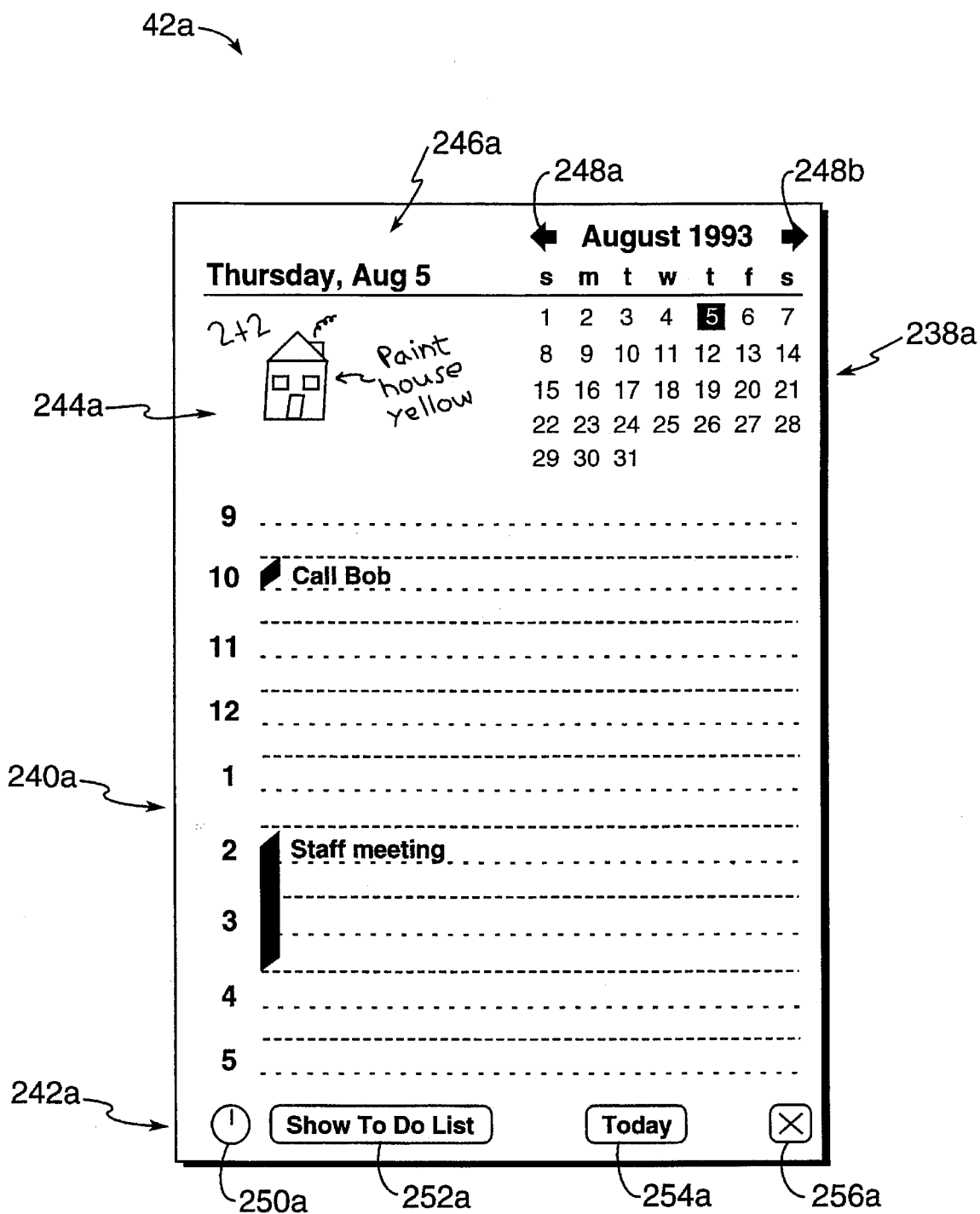
FIGS. 11a–11f are six views of the screen of the computer system of the present invention when under the control of the process of the present invention.

In FIG. 11a, a viewing screen 42a includes a calendar controller 238a, a content area 240a, a status bar 242a, a note area 244a, and a header bar 246a. The calendar controller 238a comprises a plurality of dates arranged in tabular form, i.e. in the form of a calendar. The date "5" is highlighted by a reverse video to show a selection of the date Thursday, Aug. 5, 1993. Day labels "s m t w t f s" are provided above the plurality of dates, and form a part of the calendar controller 238a. Above the day labels is a display of the current month and year, and two scroll arrows 248a and 248b. The scroll arrows permit the month to be decremented (arrow 248a) and incremented (arrow 248b). The content area 240a contains a schedule in accordance with the present invention. The hours of a day (in this case August 5th) are provided along the left hand side of the content area 240a, an divider lines are provided at every half hour. Meetings can be scheduled on the half hour, and duration bars are may be provided to indicate the duration of the meetings. The status bar 242a includes (from left to right) a real-time clock 250a which shows the time in an analog fashion, a "mode" button 252a, a "Today" button 254a, and a close box 256a. The mode button 252a is used to toggle between the Calendar ("Schedule") and the To-Do list. The Today button will select today's date on the calendar controller 238a, and the close button 256a will close the schedule application. The note area 244a displays notes (preferably unrecognized as described previously) which were store in the frame system in association with date Aug. 5, 1993. The header bar 246a displays the day and date (here Thursday, August 5).

Figure 11B:
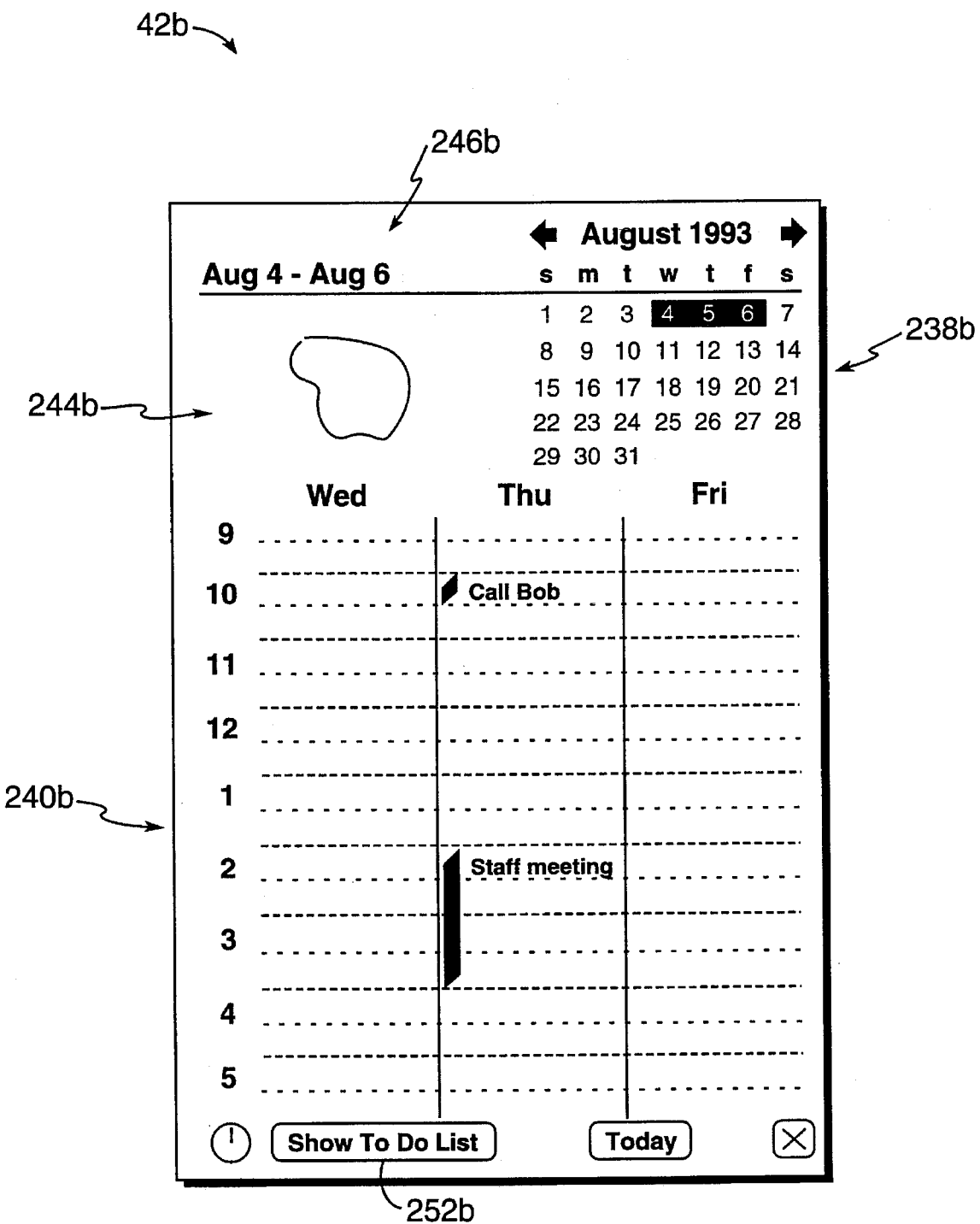

FIG. 11b illustrates a screen 42b where the dates 4, 5, and 6 of Aug. 1993 have been selected in accordance with the computer implemented method of the present invention. As seen, the dates 4, 5, and 6 are shown in reverse video to indicate their selection. Alternatively, other devices such a drawing a boundary box around the dates 4, 5, and 6 can be used to indicate selection. Schedules for those dates are provided in the content area 240b to the extent possible. Preferably, the content area 240b is equally split between the three dates selected. The note area 244b displays notes for the three dates to the extent possible. Here the note area is shown with a shapeless object which represents possible notes made by a user of the system. The header bar 246b indicates that the dates selected are August 4–August 6.

Figure 11C:
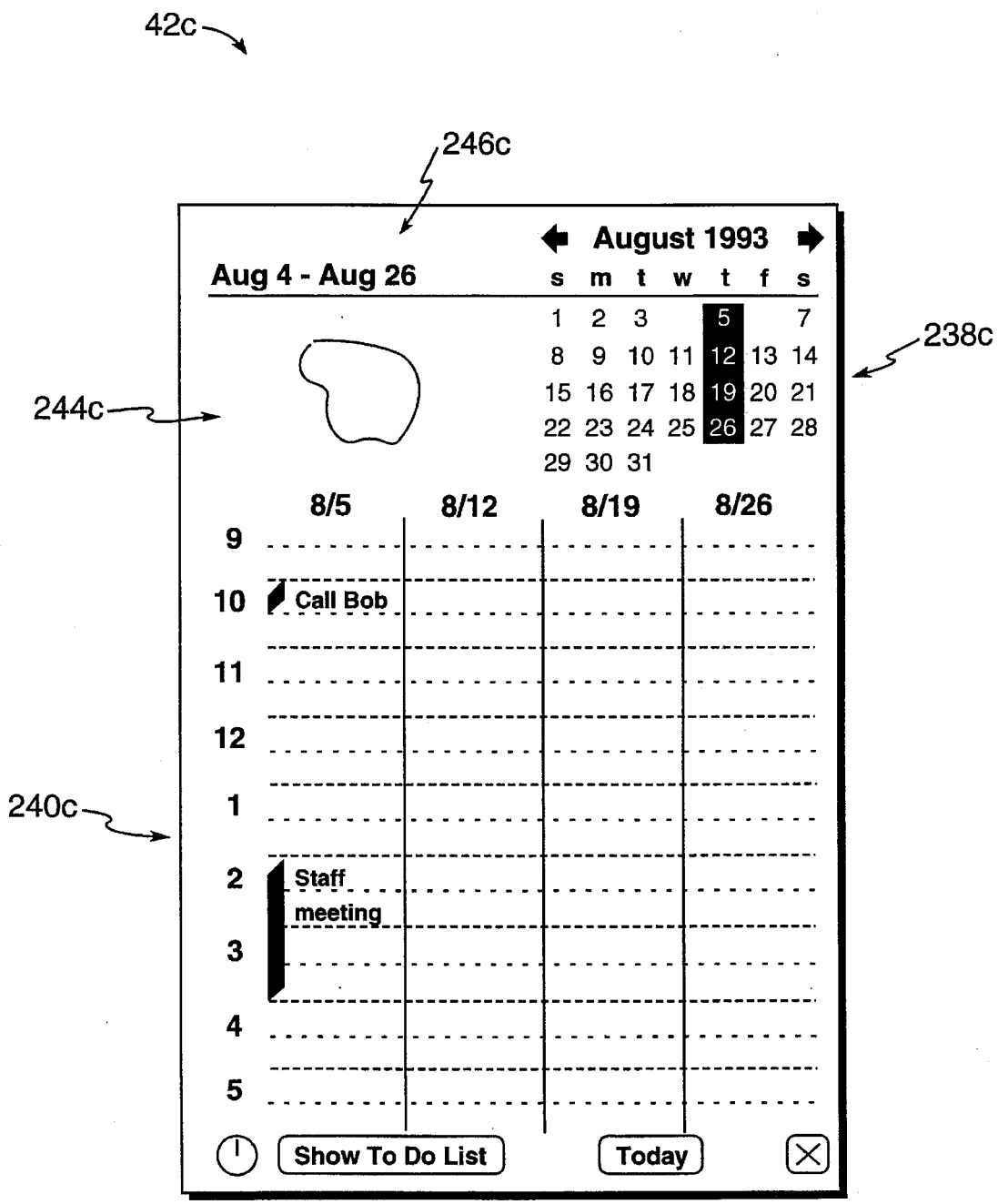

FIG. 11c illustrates a screen 42c where the dates 5, 12, 19, and 26 have been selected on a calendar controller 238c. There were two methods disclosed in these specifications for selecting these dates. A first method comprises placing the stylus on a first date (either the 5 or the 26) and dragging the stylus across the screen 42c to a last date (either the 26 or the 5, respectively). A second method comprises tapping the Thursday day label (the second "t" just over the number 5) to select all Thursdays in the month. The content area 240c then displays information for the four dates.

Figure 11D:
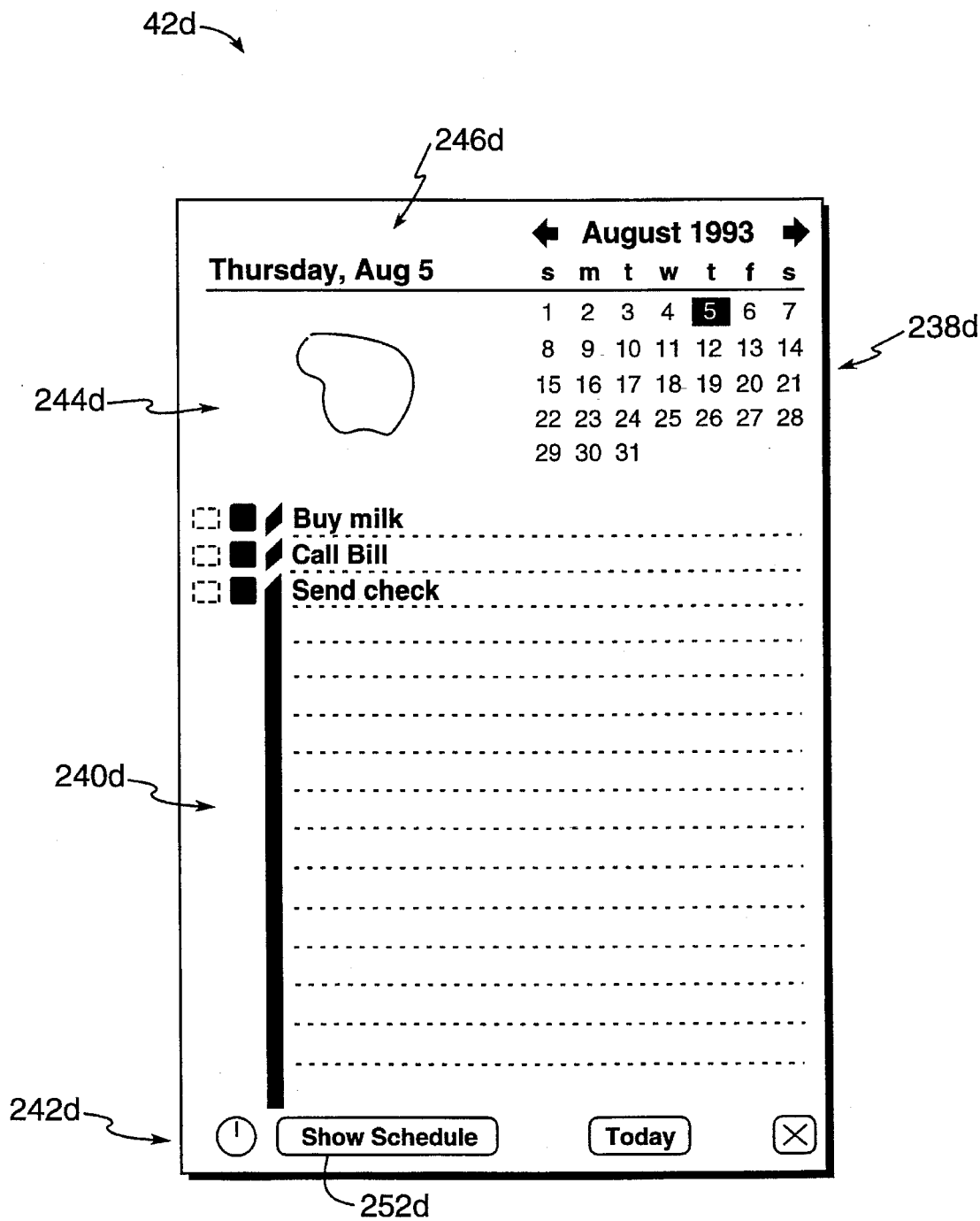

FIG. 11d illustrates a screen 42d where the date Aug. 5, 1993 has been selected on the calendar controller 238d and a To-Do list is displayed in the content area 240d. This screen can be produced, for example, by contacting the mode button 252a of FIG. 11a to "toggle" the mode from Schedule to To-Do. As noted in FIG. 11d, the mode button 252d now indicated "Show Schedule" rather than "Show To-Do List" as in FIGS. 11a–11c. Otherwise, the status bar 242d operates in the same fashion as the status bar 242a of FIG. 11a. The operation of the note area 244d and header bar 246d are also similar to that previously described. The content area 240d itself includes a "To-Do" list for Thursday, Aug. 5, 1993. Each To-Do item is provided with one or more lines of text, and check boxes are provided to indicate completion or non-completion of the item. Uncompleted items can be "swept forward" into subsequent days if they are not completed.

Figure 11E:
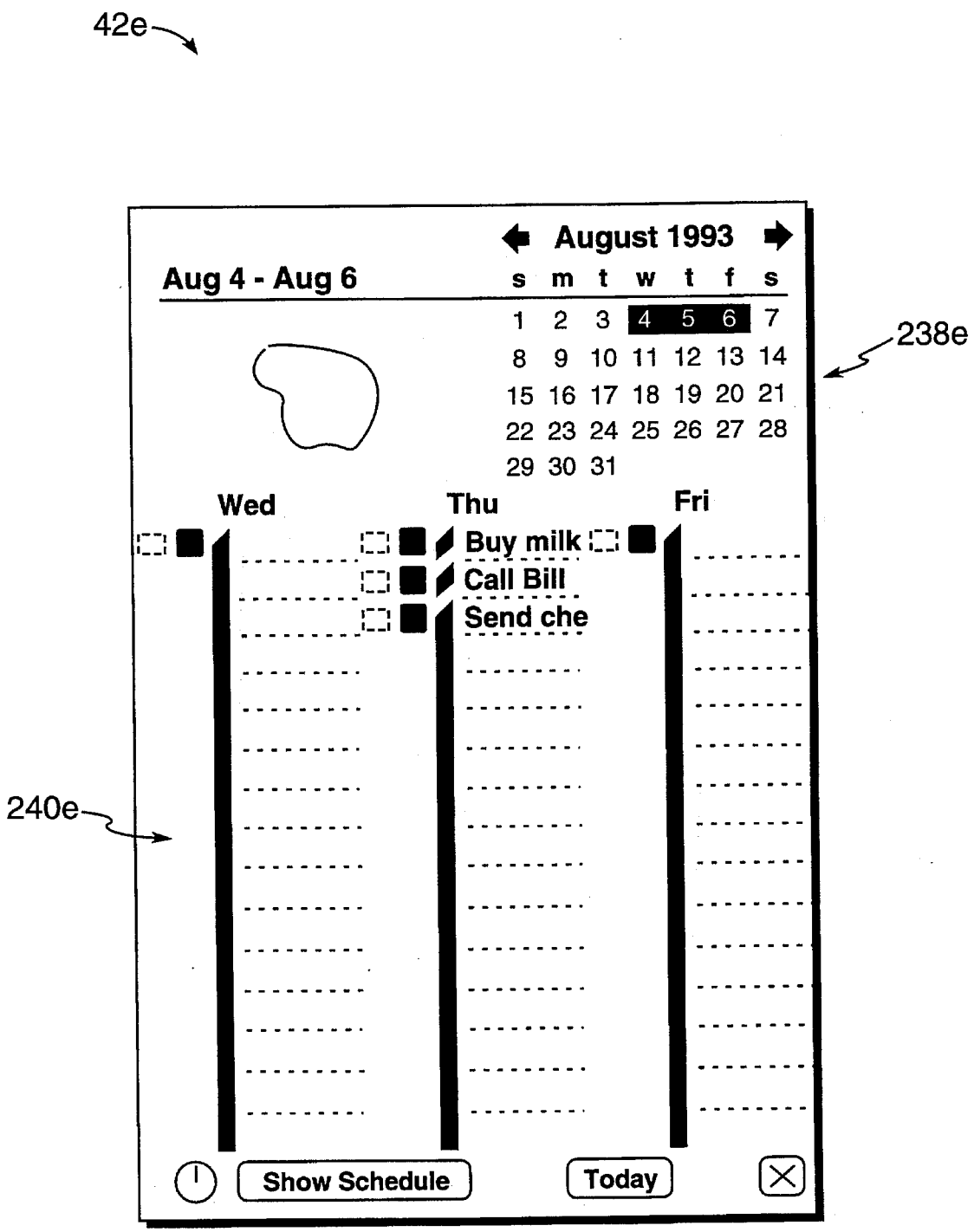

FIG. 11e illustrates a screen 42e where the dates Aug. 4, 5, and 6 1993 have been selected and where the content area 240e is in the To-Do list mode. Since three dates have been selected, three To-Do lists are displayed (to the extent possible) in the content area 240e. This screen can be accessed by activating the mode button 252b of FIG. 11b, or by selecting the dates 4, 5, and 6 from FIG. 11d.

Figure 11F:
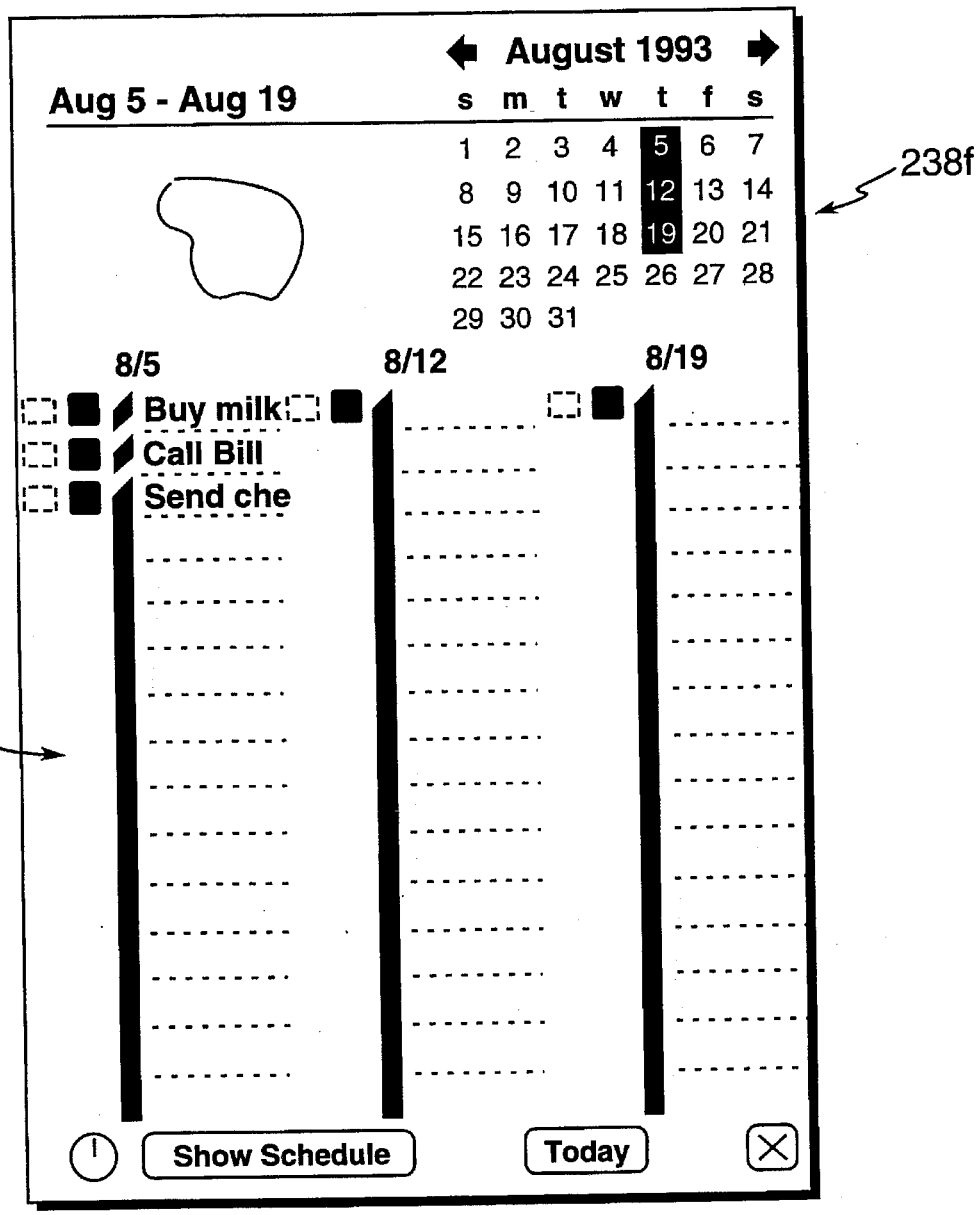

Finally, FIG. 11f illustrates a screen 42f where the dates 5, 12, and 19 of Aug. 1993 are selected on the calendar controller 238f. To-Do items for these three dates are displayed, to the extent possible, in the content area 240f.

It should be noted, in all of the examples of FIGS. 11a–11f, that the calendar controller 238 and the content area 240 are concurrently active (i.e. they are non-modal) allowing changes to be input into both of them by means of the stylus. This permits a user to add, delete, or modify information within the content area 240 and to change the date and date range dynamically without entering and exiting separate, modal applications.

While this invention has been described in terms of several preferred embodiments, there are alterations, permutations, and equivalents which fall within the scope of this invention. It should also be noted that there are may alternative ways of implementing the processes of the present invention. For example, much of the programming can be simplified by using the high-level utilities and data structures mentioned in the preceding specification. In particular, the described frame database system and view system are preferred methods for simplifying the programming tasks required by the computer implemented processes of the present invention, but there are many other database and graphics systems which can be used to accomplish the same task.

It is therefore intended that the following appended claims be interpreted as including all such alterations, permutations, and equivalents as fall within the true spirit and scope of the present invention.

What is claimed is:

1. A method for controlling a schedule and a to-do list on a computer display comprising;

displaying a calendar controller on said computer display;

selecting a plurality of dates on said calendar controller;

determining a display mode; and, displaying a content area on said computer display, said content area comprising at least one of a schedule and a to-do list for said plurality of dates, wherein information is entered into and viewed from said content area while said calendar controller remains visible and active, wherein information corresponding to said plurality of dates is displayed as a part of said schedule.

2. A method for controlling a schedule and a to-do list as recited in claim 1 wherein said calendar controller is a one-month calendar controller.

3. A method for controlling a schedule and a to-do list as recited in claim 2 wherein in a current date is selected as a default date upon the initial display of said calendar controller.

4. A method for controlling a schedule and a to-do list as recited in claim 1 wherein said step of selecting a plurality of dates comprises:

selecting a plurality of dates with a pointing means; and activating said plurality of dates.

5. A method for controlling a schedule and a to-do list as recited in claim 4 further comprising the step of indicating said selection of at least one date on said calendar controller, wherein said step of indicating said selection comprises highlighting said selection.

6. A method for controlling a schedule and a to-do list as recited in claim 4 wherein said calendar controller is displayed in a tabular from with days of the weeks being linearly arranged with a day label, and whereby said step of selecting a plurality of dates comprises selecting all of the dates within a month which fall on the same day of the week by selecting a day label with said pointing means.

7. A method for controlling a schedule and a to-do list as recited in claim 3 wherein said computer display is a display assembly of a pen-based computer system, and wherein said pointing means is a stylus.

8. A method for controlling a schedule and a to-do list as recited in claim 7 wherein said plurality of dates are selected with said stylus by placing said stylus on a first date and moving said stylus to a last date without removing said stylus from said display.

9. A method for controlling a schedule and a to-do list as recited in claim 8 further comprising the step of indicating said selection of said plurality of dates.

10. A method for controlling a schedule and a to-do list as recited in claim 7 wherein said plurality of dates are selected by engaging said stylus with a day of the week label provided on said calendar controller, whereby all dates in a month falling on a day of the week indicated by said label are selected.

11. A method for controlling a schedule and a to-do list as recited in claim 1 wherein said step of displaying a content area comprises displaying information concerning said plurality of dates.

12. A method for controlling a schedule and a to-do list as recited in claim 1 wherein said information is displayed in side-by-side information areas which correspond to said plurality of dates.

13. A method for controlling a schedule and a to-do list as recited in claim 12 wherein said side-by-side information areas are approximately the same size and configuration.

14. A scheduling and to-do list apparatus comprising:

computation means;

display means coupled to said computation means;

means for determining a display mode;

means for displaying a calendar controller on said display means, wherein said calendar controller includes a display of a plurality of dates;

means for selecting a plurality of dates on said calendar controller; and means for displaying a content area on said display means, said content area comprising at least one of a schedule and a to-do list on said computer display for said selected plurality of dates, wherein information is entered into and viewed from said content area while said calendar controller remains visible and active, wherein information corresponding to said selected plurality of dates is displayed as a part of said schedule.

15. A scheduling and to-do list apparatus as recited in claim 14 further comprising pointing means for selecting a plurality of dates on said calendar controller.

16. A scheduling and to-do list apparatus as recited in claim 15 wherein said pointing means comprises a stylus of a pen-based computer system.

17. A scheduling and to-do list apparatus as recited in claim 15 wherein said means for determining a display mode comprises button means, whereby said content area can be toggled between said schedule and said to-do list by activating said button means.

18. A method for controlling multiple, date-based applications on computer display comprising:

displaying a controller means comprising a first plurality of dates on a computer display;

selecting a second plurality of dates from said first plurality of dates of said controller;

determining a display mode; and displaying a content area on said computer display, said content area comprising at least one of a plurality of date-based applications for said selected second plurality of dates, wherein information is entered into and viewed from said content area while said calendar controller remains visible and active, wherein information corresponding to said selected second plurality of dates is displayed as a part of said at least one of a plurality of date-based applications.

19. A method as recited in claim 18 wherein said controller means comprises a representation of a calendar month.

20. A method as recited in claim 19 wherein said plurality of date based applications include a schedule application and a to-do application.

21. A method for controlling multiple, date-based applications on computer display comprising:

displaying a controller means comprising a first plurality of dates on a computer display;

selecting a second plurality of dates from said first plurality of dates on said controller means; and displaying a content area of said computer display, said content area comprising information derived from a date-based application for said selected second plurality of dates, wherein information is entered into and viewed from said content area while said calendar controller remains visible and active, wherein information corresponding to said selected second plurality of dates is displayed as a part of said information derived from a date-based application.

22. A method as recited in claim 21 wherein said controller means comprises a representation of a calendar month.

23. A method as recited in claim 21 further comprising the steps of:

detecting pointer contact within a note area of said computer display; and drawing said pointer contact within said note area.

24. A method as recited in claim 23 wherein said note area is adjacent to said calendar controller.

25. A method as recited in claim 23 wherein said drawing step renders said pointer contact as ink on said computer display.

* * * * *

UNITED STATES PATENT AND TRADEMARK OFFICE
CERTIFICATE OF CORRECTION

PATENT NO. : 5,570,109
DATED : October 29, 1996
INVENTOR(S) : Scott A. Jenson

It is certified that error appears in the above-indentified patent and that said Letters Patent is hereby corrected as shown below:

Column 1, line 49, after "CPU" insert --.--
Column 1, line 56, change "CPL" to --CPU--
Column 2, line 4, change "o" to --of--
Column 2, line 6/7, change "di play" to --display--
Column 2, line 12, change "s" to --is--
Column 2, line 13, change "he" to --the--
Column 2, line 26, after "user" insert --,--
Column 3, line 3, change "tie" to --the--
Column 3, line 6, change "determine" to --determined--
Column 4, line 18, change "The" to --the--
Column 4, line 39, change "Of" to --of--
Column 4, line 54, change "1/0" to --I/O--
Column 8, line 54, after "clicked" replace "," with --.--
Column 14, line 29, after "wherein" delete "in"

Signed and Sealed this

Twenty-first Day of January, 1997

Attest:

BRUCE LEHMAN

*Attesting Officer*  *Commissioner of Patents and Trademarks*